United States Patent
Yuan et al.

(10) Patent No.: US 10,757,106 B2
(45) Date of Patent: Aug. 25, 2020

(54) RESOURCE ACCESS CONTROL METHOD AND DEVICE

(71) Applicant: Tencent Technology (Shenzhen) Company Limited, Shenzhen (CN)

(72) Inventors: Zhe Yuan, Shenzhen (CN); Ying Xiao, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/298,936

(22) Filed: Mar. 11, 2019

(65) Prior Publication Data
US 2019/0207945 A1 Jul. 4, 2019

Related U.S. Application Data

(63) Continuation of application No. PCT/CN2017/112845, filed on Nov. 24, 2017.

(30) Foreign Application Priority Data

Nov. 28, 2016 (CN) .......................... 2016 1 1064666

(51) Int. Cl.
*H04L 29/06* (2006.01)
*H04L 29/08* (2006.01)

(52) U.S. Cl.
CPC ........ *H04L 63/101* (2013.01); *H04L 63/0876* (2013.01); *H04L 63/102* (2013.01); *H04L 63/104* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,954,150 B2 * | 5/2011 | Croft | ..................... | G06F 3/1415 726/21 |
| 8,136,150 B2 * | 3/2012 | Hayler | ................ | G06F 12/1466 713/150 |

(Continued)

FOREIGN PATENT DOCUMENTS

| CN | 1805336 A | 7/2006 |
|---|---|---|
| CN | 101552784 A | 10/2009 |

(Continued)

OTHER PUBLICATIONS

Tencent Technology, ISR, PCT/CN2017/112845, Dec. 22, 2017, 2 pgs.

(Continued)

*Primary Examiner* — Farid Homayounmehr
*Assistant Examiner* — Olanrewaju J. Bucknor
(74) *Attorney, Agent, or Firm* — Morgan, Lewis & Bockius LLP

(57) ABSTRACT

Embodiments of the present disclosure provide a resource access control method performed by a computing device. The computing device pre-stores an association relationship between tag information and a group resource and an association relationship between the tag information and access permission, respectively. After receiving a group resource access instruction, the group resource access instruction indicating a group resource to which a user requests access, the computing device obtains tag information granted to the user from the tag information associated with the group resource and then obtains access permission associated with the tag information based on the tag information granted to the user. Finally, the computing device (Continued)

compares the access permission with resource permission of the group resource, and permitting or rejecting, based on a comparison result, a group resource access requested by the user.

17 Claims, 9 Drawing Sheets

(56) References Cited

U.S. PATENT DOCUMENTS

| | | | | |
|---|---|---|---|---|
| 8,656,465 B1* | 2/2014 | Fong-Jones | ......... | G06F 21/6281 713/165 |
| 8,856,865 B1* | 10/2014 | Martini | ................... | H04L 63/20 709/223 |
| 2003/0065795 A1* | 4/2003 | Bortoloso | ........... | G06F 21/6218 709/229 |
| 2003/0088786 A1* | 5/2003 | Moran | ................. | H04L 63/105 726/4 |
| 2004/0088543 A1 | 5/2004 | Garg et al. | | |
| 2008/0109897 A1* | 5/2008 | Moran | ................ | G06F 21/6218 726/19 |
| 2014/0208414 A1* | 7/2014 | Brandwine | ......... | G06F 21/6218 726/17 |
| 2014/0330732 A1* | 11/2014 | Grignon | ................. | G06Q 50/01 705/319 |
| 2016/0371611 A1* | 12/2016 | Grignon | ................. | G06Q 50/01 |
| 2017/0060906 A1* | 3/2017 | Born | ................... | G06F 16/2455 |
| 2018/0019869 A1* | 1/2018 | Savage | ................ | G06F 21/606 |
| 2018/0332046 A1* | 11/2018 | Zhang | .................... | H04L 29/06 |

FOREIGN PATENT DOCUMENTS

| | | |
|---|---|---|
| CN | 101599116 A | 12/2009 |
| CN | 101895551 A | 11/2010 |
| CN | 101902402 A | 12/2010 |
| CN | 102469089 A | 5/2012 |
| CN | 102868525 A | 1/2013 |
| CN | 103327100 A | 9/2013 |
| CN | 104995598 A | 10/2015 |
| CN | 105721420 A | 6/2016 |
| CN | 106506521 A | 3/2017 |

OTHER PUBLICATIONS

Tencent Technology, WO, PCT/CN2017/112845, Dec. 22, 2017, 7 pgs.
Tencent Technology, IPRP, PCT/CN2017/112845, May 28, 2019, 8 pgs.

* cited by examiner

RESOURCE ACCESS CONTROL METHOD AND DEVICE

CROSS-REFERENCE TO RELATED APPLICATIONS

This application is a continuation application of PCT/CN2017/112845, entitled "RESOURCE ACCESS CONTROL METHOD AND DEVICE" filed on Nov. 24, 2017, which claims priority to Chinese Patent Application No. 201611064666.9, filed with the Chinese Patent Office on Nov. 28, 2016, and entitled "RESOURCE ACCESS CONTROL METHOD AND APPARATUS", all which are incorporated herein by reference in their entirety.

FIELD OF THE TECHNOLOGY

The present disclosure relates to the field of information security technologies, and in particular, to a resource access control method and apparatus.

BACKGROUND OF THE DISCLOSURE

With the development of computer application technologies, various resources may be provided, for example, a resource in the Internet and a resource stored in a computer device. A user may obtain a desired resource by requesting access to the resource.

During the access to the resource, based on a security factor, resource access control is implemented by configuring access permission of the resource. A user granted with the access permission can successfully access the resource. If the user requesting to access to the resource is not granted with the access permission, the resource access request of the user is rejected.

Implementation of existing resource access is limited to one group of resources, and unified resource access control cannot be implemented across groups.

For example, one group of indicated resources may be resources provided by a service of the Internet. A user having access permission cannot access a resource of another service. If needing to access the resource of the another service, the user needs to obtain authorization again.

That is, existing resource access control cannot be implemented across groups. When the user requests to access to resources in at least two groups, the user needs to respectively control access permission.

In other words, batch authorization of the user cannot be implemented for resources across groups.

SUMMARY

Embodiments of the present disclosure provide a resource access control method and apparatus, and a non-volatile computer-readable storage medium.

According to a first aspect, the present application provides a resource access control method performed at a computing device, the method including:

pre-storing an association relationship between tag information and a group resource and an association relationship between the tag information and access permission, respectively;

receiving a group resource access instruction, the group resource access instruction indicating a group resource to which a user requests access;

obtaining tag information granted to the user from the tag information associated with the group resource;

obtaining access permission associated with the tag information based on the tag information granted to the user; and comparing the access permission with resource permission of the group resource, and permitting or rejecting, based on a comparison result, a group resource access requested by the user.

According to a second aspect, the present application provides a computing device having one or more processors, memory coupled to the one or more processors, and a plurality of programs stored in the memory that, when executed by the one or more processors, cause the computing device to perform the aforementioned resource access control method.

According to a third aspect, this application provides a non-transitory computer readable storage medium storing a plurality of instructions in connection with a computing device having one or more processors. The plurality of instructions, when executed by the one or more processors, cause the computing device to perform the aforementioned resource access control method.

It should be understood that the above general descriptions and the following detailed descriptions are merely exemplary, and cannot limit the present disclosure.

BRIEF DESCRIPTION OF THE DRAWINGS

The accompanying drawings, which are incorporated herein and constitute a part of this specification, illustrate embodiments consistent with the present disclosure and, together with the description, serve to explain the principles of the present disclosure.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

Figure 1:
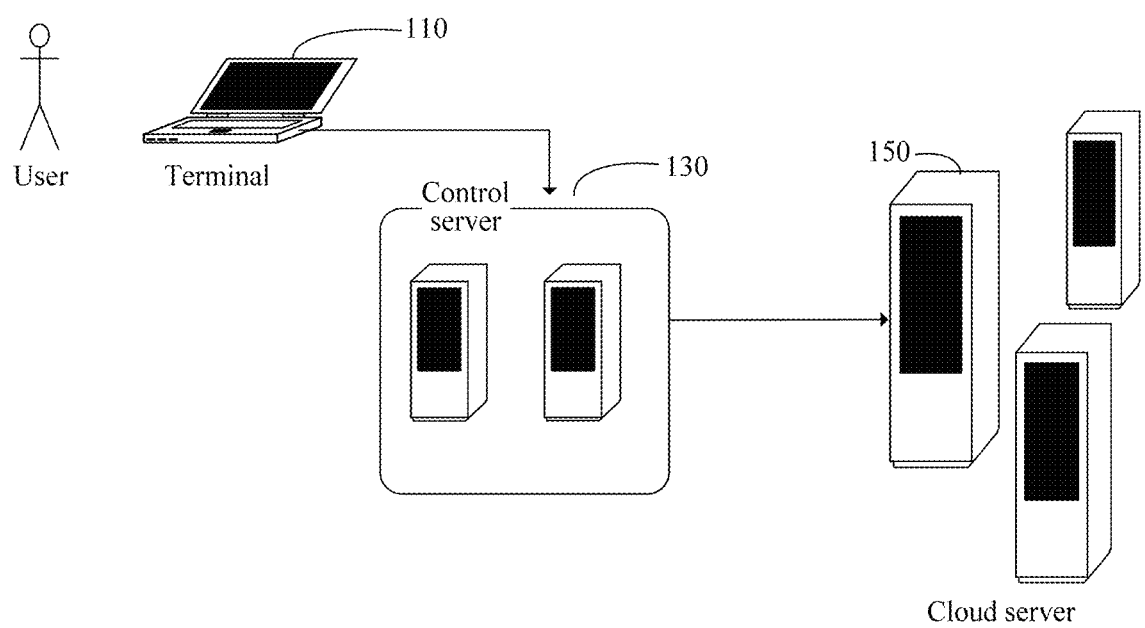
FIG. 1 is a schematic diagram of an implementation environment according to an embodiment of the present disclosure.

FIG. 1 is a schematic diagram of an implementation environment according to an embodiment of the present disclosure. The implementation environment includes a terminal 110, a control server 130, and a cloud server 150.

The terminal 110 may access the cloud server 150 under control of the control server 130. The cloud server 150 is configured to: provide various cloud services, and store a resource for each cloud service.

The control server 150 may implement a console wizard for the terminal 110. Therefore, under an effect of the console wizard, the terminal 110 can perform cloud service resource access.

That is, the control server 150 may implement resource access control over resource access initiated by the terminal 110.

Figure 2:
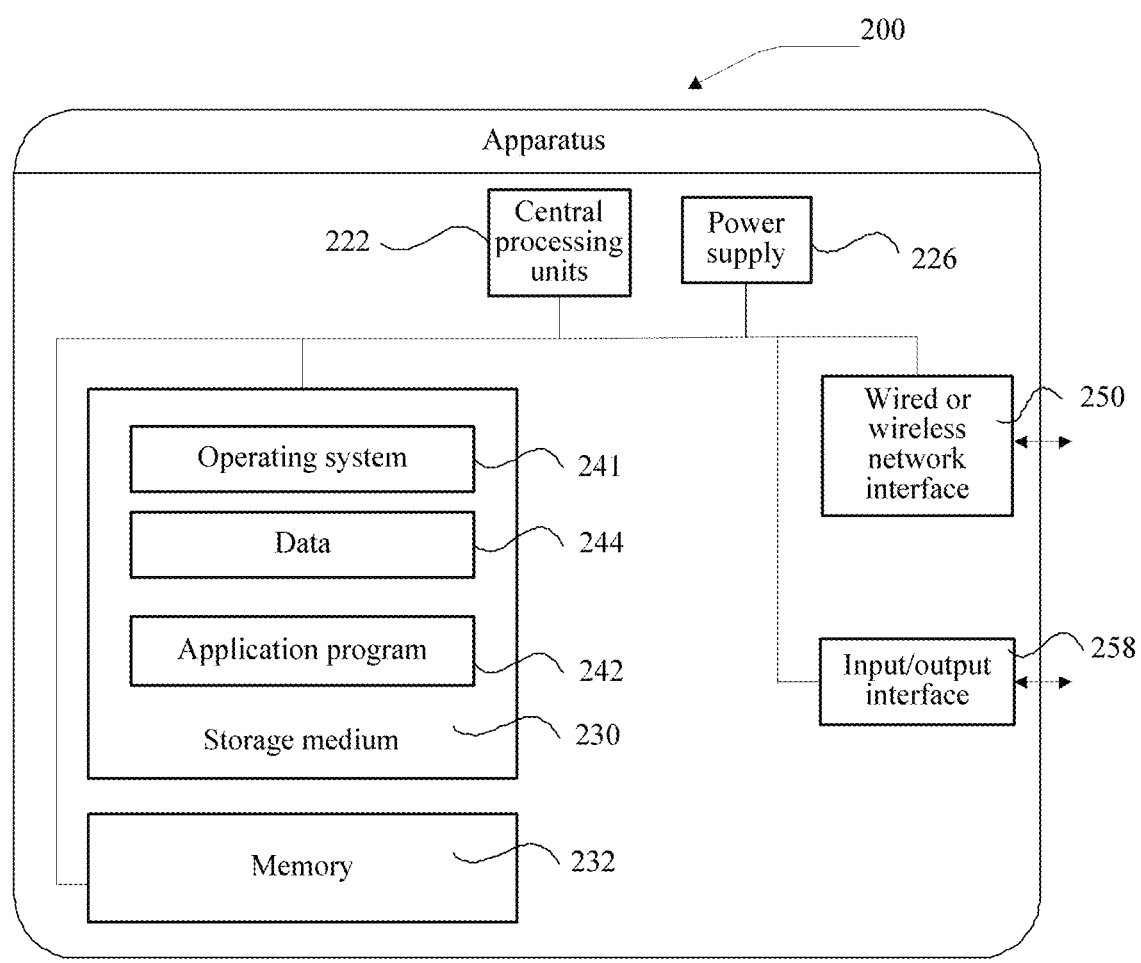
FIG. 2 is a block diagram of an apparatus according to an exemplary embodiment.

FIG. 2 is a block diagram of an apparatus 200 according to an exemplary embodiment. For example, the apparatus 200 may be the control server 130 in the implementation environment shown in FIG. 1.

The apparatus 200 may vary greatly due to different configurations or performance, and may include one or more central processing units (CPU) 222 (for example, one or more processors) and a memory 232, and one or more storage media 230 (for example, one or more mass storage devices) that store application programs 242 or data 244. The memory 232 and the storage medium 230 may be transient or persistent storages. The program stored in the storage medium 230 may include one or more modules (not shown in the figure), and each module may include a series of instructions and operations for the apparatus 200. Further, the CPU 222 may be configured to: communicate with the storage medium 230, and perform, on the apparatus 200, the series of instructions and operations in the storage medium 230. The apparatus 200 may further include one or more power supplies 226, one or more wired or wireless network interfaces 250, one or more input/output interfaces 258, and/or one or more operating systems 241, for example, Windows Server™, Mac OS X™, Unix™, Linux™, or FreeBSD™. Steps in the embodiments shown in FIG. 3, FIG. 4, FIG. 5, FIG. 6, and FIG. 7 are performed based on the apparatus shown in FIG. 2.

Figure 3:
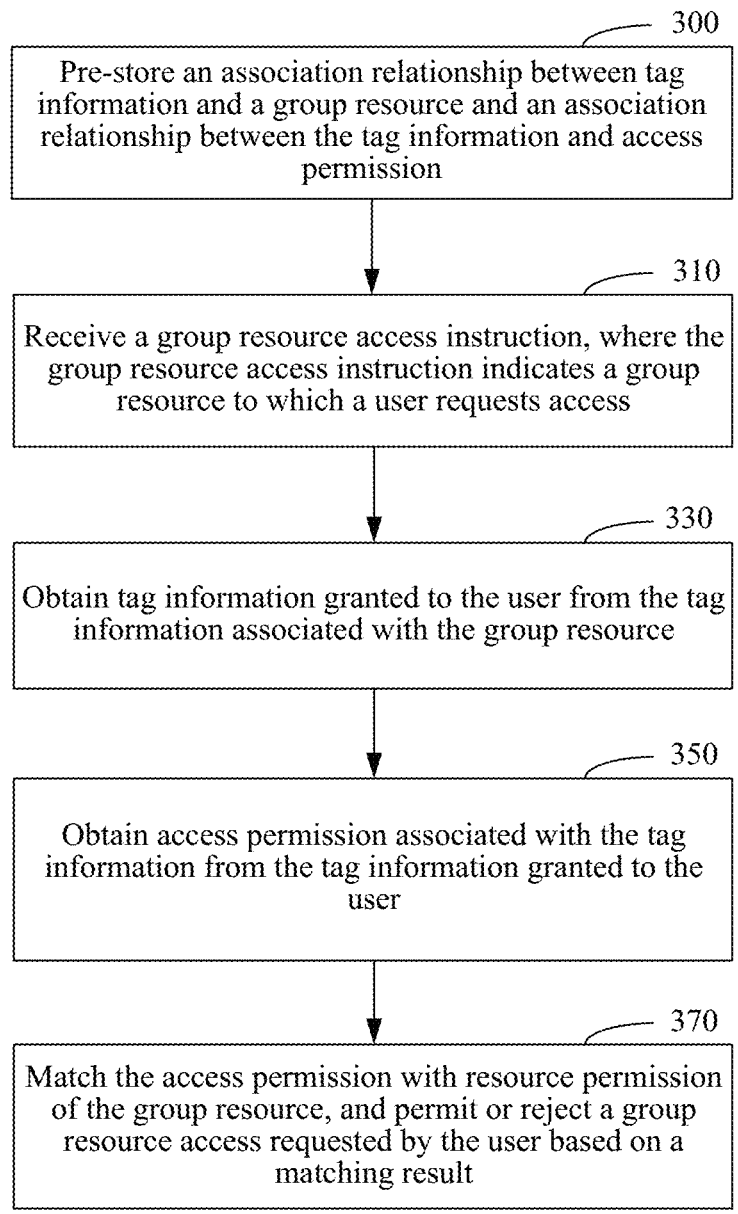
FIG. 3 is a flowchart of a resource access control method according to an exemplary embodiment.

FIG. 3 is a flowchart of a resource access control method according to an exemplary embodiment. The resource access control method is applied to the control server 130 in the implementation environment shown in FIG. 1. The control server 130 may be the apparatus shown in FIG. 2 in an exemplary embodiment. As shown in FIG. 3, the resource access control method may be performed by the control server 130, and may include the following steps.

In step 300, an association relationship between tag information and a group resource and an association relationship between the tag information and access permission are pre-stored.

In step 310, a group resource access instruction is received, where the group resource access instruction indicates a group resource to which a user requests access.

The group resource access instruction is an instruction that is initiated by a terminal and that is used to request group resource access. The group resource access requested by using the group resource access instruction may be group resource access of a single group, or may be cross-group resource access. This is not limited herein.

Correspondingly, the group resource that is indicated in the group resource access instruction and to which the user requests access may be a group resource belonging to a group, or may be a group resource belonging to at least two groups.

It should be added herein that in specific implementation of an exemplary embodiment, the user exists in a data form of user identifier, to uniquely identify the user and a resource access process performed by the user.

For example, in the implementation environment shown in FIG. 1, the group resource access instruction is sent to the control server 130 by using the terminal 110, to send a request to the control server 130 to request access to the group resource.

It should be noted herein that the group resource exists in a data form of a resource identifier or a resource name, and entity data corresponding to the group resource is stored.

In step 330, tag information granted to the user is obtained from the tag information associated with the group resource.

The tag information is used to implement an unique tag. In other words, the tag information has uniqueness. For the tag information granted to the user, the tag information may uniquely identify the user or a user set.

As previously discussed, the group resource to which the user requests access belongs to one or at least two groups. Therefore, the tag information granted to the user needs to be obtained from the tag information associated with the group resource belonging to one or at least two groups.

In step 350, access permission associated with the tag information is obtained from the tag information granted to the user.

In addition to having the association relationship with the group resource, the tag information also has the association relationship with the access permission. The access permission is used to indicate an accessible resource and an access manner, for example, indicate a user operation that may be performed to perform resource access.

After the tag information granted to the user is obtained by performing the foregoing steps, the access permission associated with the tag information granted to the user is obtained based on the association relationship between the tag information and the access permission. The access permission is access permission granted to the user.

In step 370, the access permission is matched with resource permission of the group resource, and a group resource access requested by the user is permitted or rejected based on a comparison result.

The resource permission of the group resource is access permission required by the group resource access. Only when the access permission granted to the user is consistent with the access permission, the group resource access requested by the user is permitted. Conversely, the group resource access requested by the user is rejected.

During implementation of the foregoing resource access control, the user and the group resource are connected by using the tag information. On one hand, the tag information is granted to the user. Because the tag information is associated with the group resource and the access permission, authorization of the user may be implemented. On the other hand, access control of a resource may be directly implemented by using the tag information, so that the user is allowed to access the group resource when the user has the access permission. According to this embodiment of the present disclosure, the authorization efficiency is improved. In addition, under an effect of the tag information, the group resource to which the user requests access is no longer limited to one group. Instead, access control may be implemented for a cross-group resource, only provided that the tag information granted to the user is associated with a group resource of at least two groups. Moreover, when the tag information granted to the user is associated with the group resource of at least two groups, the control server may obtain at least two pieces of access permission for the group resource based on one piece of the tag information. Authorization management does not need to be performed for each group resource, thereby saving a processing resource of a CPU of the control server, and increasing a processing speed of the CPU.

In conclusion, the foregoing resource access control is implemented, and cross-group resource access may be implemented for the group resource of the at least two groups. In other words, the foregoing resource access control is implemented, and an access control platform may be implemented for an existing group resource of at least two groups. The access control platform may unified access control for a group resource of multiple groups.

For the user, according to the access control platform, cross-group resource access may be performed by using a resource access request performed by the access control platform, and the group resource of at least two groups is obtained, thereby implementing cross-group resource access control.

In an exemplary embodiment, the group resource access instruction is a cross-group resource access instruction, and step 130 may include the following step.

The tag information that is associated with the group resource to which the user requests access and that is granted to the user is obtained from the association relationship between the group resource and the tag information, where the group resource requested by the user belongs to at least two groups.

The cross-group resource access instruction is used to initiate a group resource access request of at least two groups. The user performs cross-group group resource access by using the cross-group resource instruction.

It should be noted that in an authorization process of the user or the user set, the association relationship between the group resource and the tag information is established, and the tag information is granted to the user or the user set.

For the tag information, the association relationship between the group resource and the tag information may be that the tag information is associated with the group resource of one group or at least two groups; and for the group resource, the association relationship may be that a quantity of the tag information associated with the group resource is not limited.

Therefore, the group resource to which the user requests access may have one piece or at least two pieces of tag information associated with the group resource. In the tag information, the tag information granted to the user may be obtained.

The foregoing process provides specific implementation for obtaining the tag information granted to the user in the cross-group resource access requested by the user, so that subsequent permission control is necessarily performed for the cross-group resource, that is, implemented for the group resource of at least two groups. That is, under effects of the tag information granted to the user and the group resource of at least two groups associated with the tag information, this resource access of the user can be performed simultaneously for the group resource of at least two groups. For access to a group resource belonging to different groups, authentication does no longer need to be performed one by one, thereby improving the resource access efficiency.

In an exemplary embodiment, step 150 may include the following step.

The access permission that is in the group resource access requested by the user and that is associated with the tag information granted to the user is obtained from the association relationship between the tag information and the access permission.

In a process of implementing authorization for the user or the user set, the association relationship between the tag information and the access permission is further constructed. As previously discussed, the tag information granted to the user has a function of uniquely identifying the user. The access permission associated with the tag information granted to the user is access permission granted to the user. The access permission granted to the user indicates a user operation that is allowed to be triggered in resource access performed by the user.

From constructed multiple pieces of association information, based on the tag information that is granted to the user and that is obtained by performing step 130 in the embodiment of FIG. 1, the access permission that is in the group resource access requested by the user and that is associated with the tag information granted to the user is obtained.

It may be understood that the group resource access requested by the user may be group resource access of one group, or may be cross-group resource access. Correspondingly, the obtained access permission is access permission for the user to access a group resource of one group, or may be access permission for a cross-group resource, that is, access permission for a group resource of at least two groups.

Figure 4:
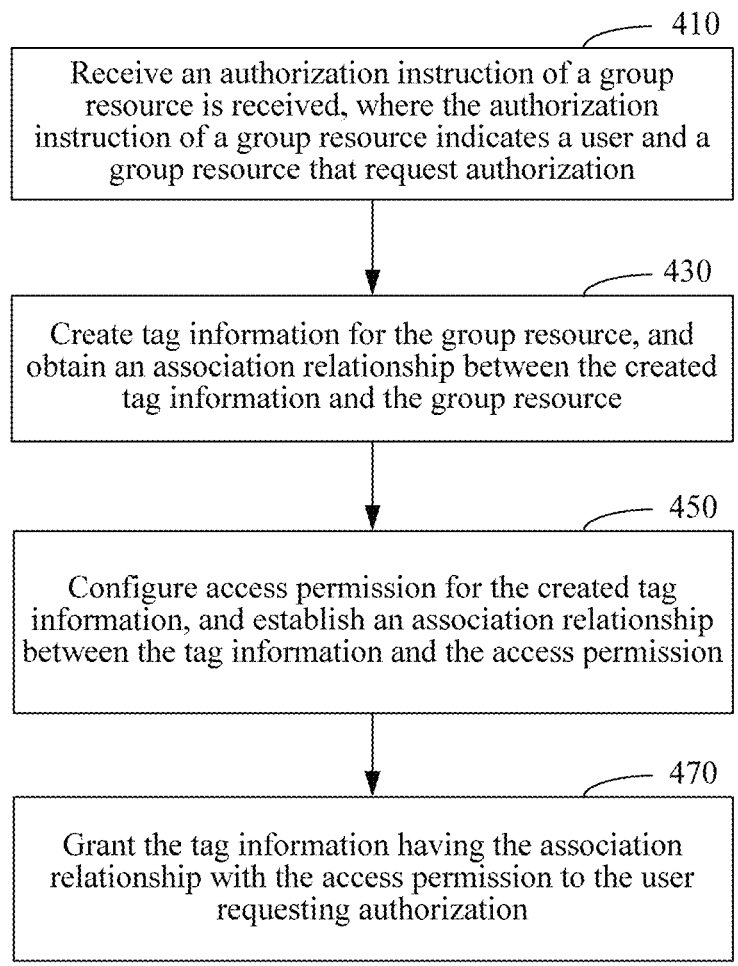
FIG. 4 is a flowchart of a resource access control method according to another exemplary embodiment.

FIG. 4 is a flowchart of a resource access control method according to an exemplary embodiment. As shown in FIG. 4, the resource access control method may include the following steps.

In step 410, an authorization instruction of a group resource is received, where the authorization instruction of a group resource indicates a user and a group resource that request authorization.

The authorization instruction of a group resource is initiated by a terminal of a user or a user as an administrator, and is used to request authorization for access to a group resource of one or at least two groups by a user or a user set. Therefore, in the authorization instruction of a group resource, the user and the group resource that request authorization are indicated. The group resource belongs to one or at least two groups. The authorization instruction of a group resource indicates that the user requesting authorization is not limited to one user, or may be a user set including multiple users. This is not limited herein.

To implement an authentication process related to the group resource access shown in the embodiment of FIG. 1, the authentication process is initiated by using the authorization instruction of a group resource. Batch user authorization may be implemented through the authorization process, and access permission for batch group resource may also be granted to the user.

In step 430, tag information is created for the group resource, and an association relationship between the created tag information and the group resource is obtained.

The tag information has uniqueness, and may be used to form a tag of the group resource, so that a group resource of one or at least two groups corresponding to the tag information forms an integrity.

The tag information may be in any form. For example, the tag information may be described by using a tag name and a key value. This is not limited herein.

A process of creating the tag information is performed for the group resource indicated in the authorization instruction. Specifically, one piece of tag information may be constructed for a group resource of one group or at least two groups, and then an association relationship between the tag information and the group resource of one group or at least two groups is established. That is, the tag information having a one-to-one or one-to-many association relationship with group resource information.

In step 450, access permission is configured for the created tag information, and an association relationship between the tag information and the access permission is established.

Based on the foregoing descriptions, the created tag information needs to be finally authorized to the user, to complete the authorization process of the user. Therefore, the access permission needs to be configured for the created tag information, that is, a user operation associated with the tag information, to control a user operation performed by the user during access to the group resource, thereby ensuring the security of the group resource.

During specific implementation of an exemplary embodiment, the association relationship established between the tag information and the access permission is an association relationship between the tag information and a user operation. When a quantity of user operations is greater than 1, the association relationship is an association relationship between the tag information and a user operation set. This is not limited herein.

In step 470, the tag information having the association relationship with the access permission is granted to the user requesting authorization.

In the foregoing process, the association relationship established between the tag information and the group resource and the association relationship between the tag information and the access permission are stored, and the created tag information is granted to the user requesting authorization by initiating the authorization instruction by using the terminal. In this way, the authorization process of the user is completed. Permission is granted to the user, helping the user securely control access permission for the group resource, for example, control users who can access the group resource, group resources that the users can access, and an access manner.

Through the foregoing process, rapid authorization for a batch of users can be implemented, and a group resource granted to be accessed may belong to at least two groups. Therefore, batch authorization for a cross-group group resource is implemented, thereby significantly improving the user authorization efficiency.

Through the foregoing process, authorization for the cross-group group resource can be implemented by using a built access control platform. When a group resource of multiple groups exists, there is no need to obtain authorization through a platform of a group one by one, thereby providing unified and efficient management for access to and authorization of scattered group resource.

Figure 5:
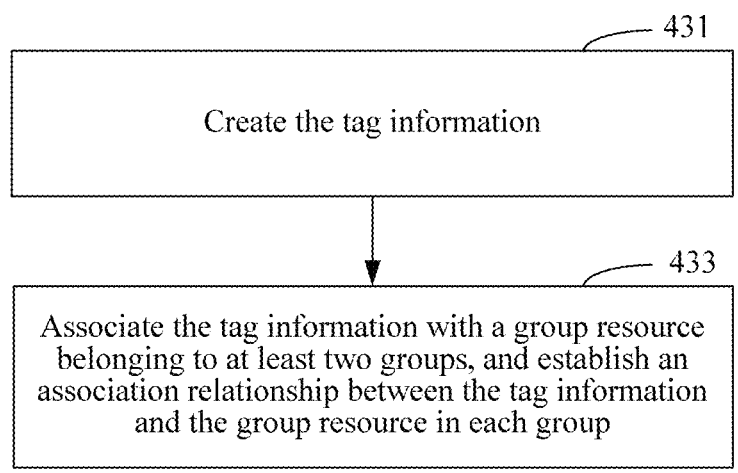
FIG. 5 is a flowchart of step 430 shown in FIG. 4 according to an exemplary embodiment.

FIG. 5 is a flowchart of step 430 shown in FIG. 4 according to an exemplary embodiment. In this embodiment, a requested group resource belongs to at least two groups. In step 430, as shown in FIG. 5, the following steps may be included.

In step 431, create the tag information.

In step 433, the tag information is associated with the group resource belonging to at least two groups, and an association relationship is established between the tag information and the group resource in each group.

Based on the embodiment corresponding to FIG. 4, after the authorization instruction initiated by the group resource in one group or at least two groups is received in step 410, the association relationship between the created tag information and the group resource is constructed according to the group resource indicated in the authorization instruction.

When the requested group resource belongs to at least two groups, the association relationship between the tag information and the group resource in each group is established, to obtain a one-to-many association relationship between the tag information and the group resource.

Through the foregoing process, the group resource in the authorization instruction is tagged, so that the access permission of the group resource is granted to the user in a subsequent process.

In an exemplary embodiment, before step 410, the resource access control method may further include the following step.

Permission configuration of the group resource is triggered, and the tag information is written to description information or a conditional element of a permission strategy of the group resource, where the tag information is associated with the access permission.

The permission configuration of the group resource is configuring a user and a user operation that can perform the group resource access. The permission configuration of the group resource is substantially a permission strategy configuration process of the group resource.

Information configured by the permission configuration may be written to the permission strategy of group resource, or may be written to the corresponding description information.

Based on the foregoing descriptions, the tag information has the associated access permission. That is, each piece of tag information has the association relationship with the corresponding access permission.

For the permission configuration of the group resource, after the associated tag information is determined, a user and a user operation that can perform the group resource access are also configured.

Therefore, the tag information may be used as a parameter and be written to the description information or the conditional element of the permission strategy of the group resource, to complete a permission configuration process of the group resource.

The tag information is used as a parameter to implement an authorization process, so that permission processing of a group may be controlled flexibly. There is no need to modify the permission strategy, and automatic authorization for a resource may be implemented by only changing a tag.

Specifically, the authorization process may be implemented in the following three manners: (1) implemented by using a native authorized grammar; (2) implemented by using an authorization interface function; or (3) implemented by using an access control platform.

For manner (1), authorization is implemented by defining a user set, an authorized user operation set, a resource set, and a context condition by using the authorized grammar. Configuration of the permission strategy may be implemented by writing the tag information to the context condition and the resource set. The tag information is used as a condition and is written to the context condition and the resource set, cross-group authorization may be implemented.

For manner (2), authorization is completed by using the authorization interface function, the tag information may be written as a parameter.

For manner (3), a tag authorization wizard is implemented in the access control platform, to guide the authorization process through interaction of the tag authorization wizard. The authorization process is performed based on writing of the tag information. For example, when description information of a resource is set by performing a wizard step, corresponding tag information is selected. When the conditional element in the permission strategy is set, the corresponding tag information is selected and used as a condition.

Authorization of the group resource is completed through the foregoing process. Moreover, under an effect of the tag information, group resources of multiple groups may be authorized flexibly, thereby improving controllability of management of the group resources.

Figure 6:
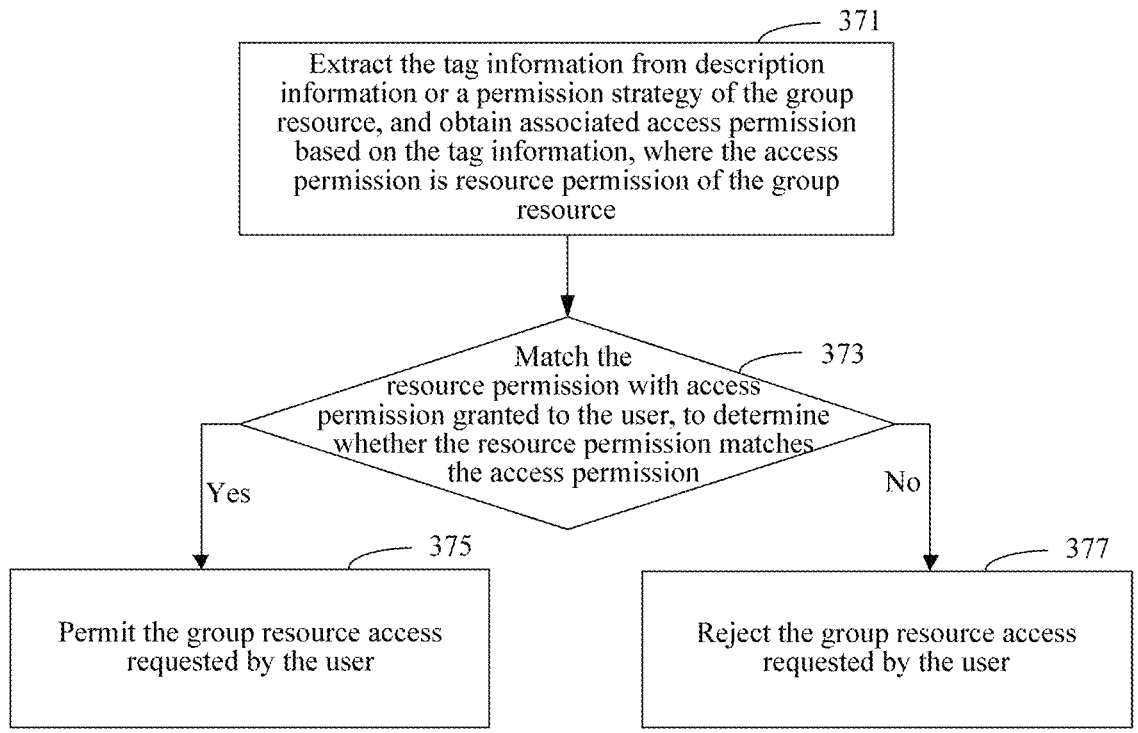
FIG. 6 is a flowchart of step 370 shown in FIG. 3 according to an exemplary embodiment.

FIG. 6 is a flowchart of step 370 shown in FIG. 3 according to an exemplary embodiment. As shown in FIG. 6, step 370 may include the following steps.

In step 371, the tag information is extracted from the description information or the permission strategy of the group resource, and associated access permission is obtained based on the tag information, where the access permission is resource permission of the group resource.

In step 373, the resource permission is matched with access permission granted to the user, to determine whether the resource permission matches the access permission, and if the resource permission matches the access permission, step 375 is performed, or if the resource permission does not match the access permission, step 377 is performed.

In step 375, the group resource access requested by the user is permitted.

In step 377, the group resource access requested by the user is rejected.

In the description information or the permission strategy of the group resource, permission configuration is implemented by using the tag information as a parameter. Therefore, correspondingly, permission of the group resource may alternatively be obtained by using the tag information written to the description information or the permission strategy.

Figure 7:
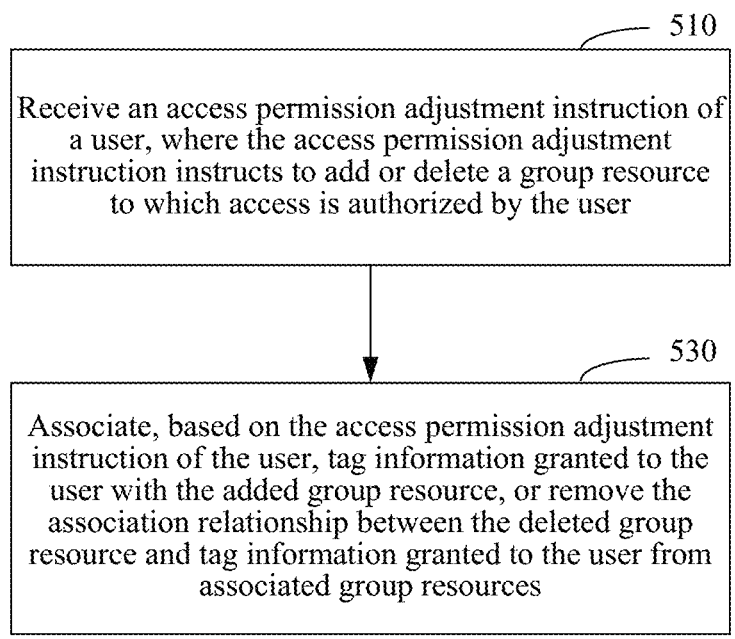
FIG. 7 is a flowchart of a resource access control method according to another exemplary embodiment.

FIG. 7 is a flowchart of a resource access control method according to another exemplary embodiment. As shown in FIG. 7, the resource access control method may include the following steps.

In step 510, access permission adjustment instruction of the user is received, where the access permission adjustment instruction instructs to add or delete a group resource to which access is authorized by the user.

The access permission adjustment instruction of a user is an instruction to adjust access permission of the user, to add, through the instruction, a group resource that can be accessed by the user or delete a group resource that can be accessed by the user.

Adjustment of the access permission of the user is performed for the user already having access permission for the group resource.

In step 530, based on the access permission adjustment instruction of the user, the tag information granted to the user is associated with the added group resource, or the association relationship between the deleted group resource and the tag information granted to the user is removed from associated group resources.

It may be learned from the foregoing descriptions that the tag information granted to the user have the association relationship with both the access permission and the group resource. After the access permission adjustment instruction is received, the associated group resource may be correspondingly adjusted, to implement effective management of permission under an effect of the tag information.

During specific implementation of an exemplary embodiment, the association relationship between the tag information and the group resource may be implemented by using the tag information and the group resource to perform a bidirectional index.

Specifically, the bidirectional index includes an index from the tag information to the group resource, and an index from the group resource to the tag information.

Correspondingly, during adjustment and updating of the association relationship, the two indexes need to be updated at the same time. In this way, adjustment of the access permission can be conveniently and rapidly implemented.

Through the foregoing process, the group resource associated with the tag information is not limited to a particular group, and may be associated with different groups as required, or a quantity of associated groups may be reduced as required.

In conclusion, the resource access control method implemented in this embodiment of the present disclosure may be applied to resource management and control of various web services including a cloud service, or may be applied to resource management and control of various large projects stored in computer devices. This is not limited herein.

Resource access control of a cloud service is used as an example, and the resource access control method is described in combination with a specific application scenario. In this application scenario, a cloud service resource is a group resource of a group. Cross-group resource access and authorization implemented by using the resource access control method is cross-service resource access and authorization.

That is, for multiple existing cloud services, the cross-service resource access may be implemented by using the resource access control method. Correspondingly, an authorization process of the cross-service resource access may also be performed for at least two cloud services in batches.

It should be noted that an existing cloud service may support a tagging function, but not all cloud services support the tagging function. According to the resource access control method in this embodiment of the present disclosure, a unified access control platform is provided for multiple cloud services, and tag-based resource access control can also be implemented without requiring the cloud services to support the tagging function.

Moreover, for the cloud services supporting the tagging function, separate authorization and management no longer needs to be performed for the cloud services one by one, thereby effectively reducing operation costs.

Figure 8:
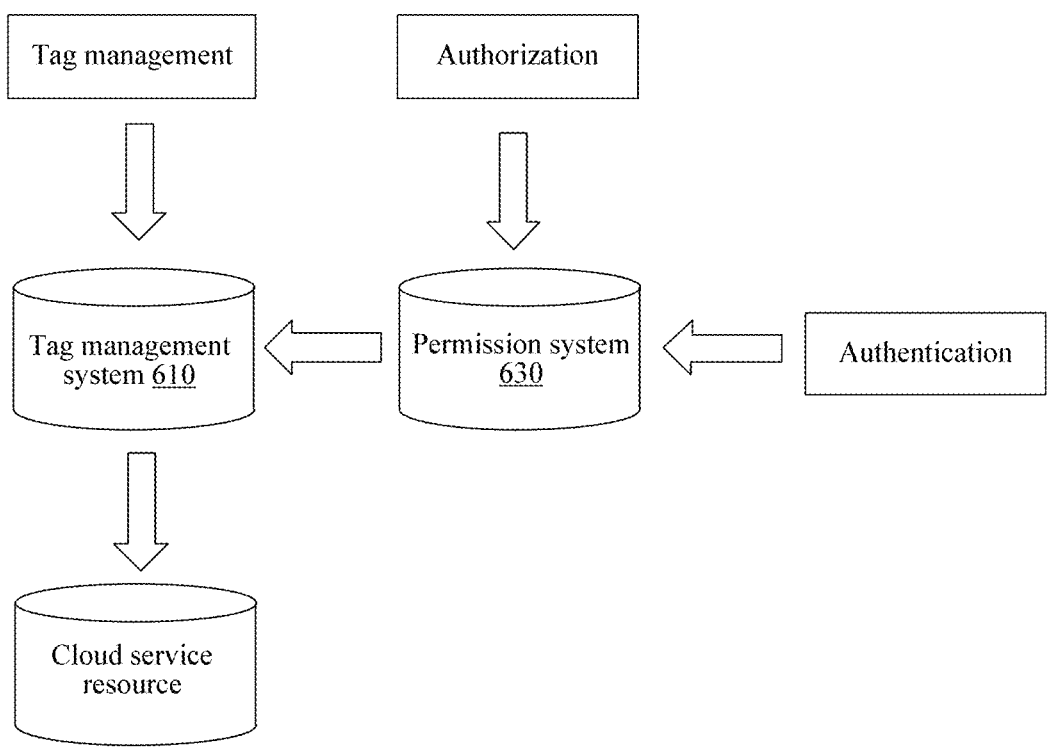
FIG. 8 is a schematic diagram of an overall framework implementing cloud service resource access control according to an exemplary embodiment.

Specifically, FIG. 8 is a schematic diagram of an overall framework implementing cloud service resource access control according to an exemplary embodiment. As shown in FIG. 8, the overall framework includes two parts, a tag management system 610 and a permission system 630, to access a cloud service.

The tag management system 610 is configured to: construct and maintain an association relationship between tag information and a cloud services, and store the association relationship.

The permission system 630 is configured to: construct and maintain an association relationship between the tag information and a user operation, and store the association relationship. The user operation in the association relationship is used to represent access permission. Specifically, the association relationship between the tag information and the user identifier maintained in the permission system 630 is written or updated by using an authorization interface function or an access control platform.

According to the overall framework implementing cloud service resource access control, a process implemented by using the overall framework may include three parts, tag management, permission management, and authentication.

First, the tag management includes constructing and adjusting an association relationship between the tag information and a cloud service resource.

Specifically, while the association relationship between the tag information and the cloud service source is constructed, the tag information is also authorized to a corresponding user, to implement authorization.

Figure 9:
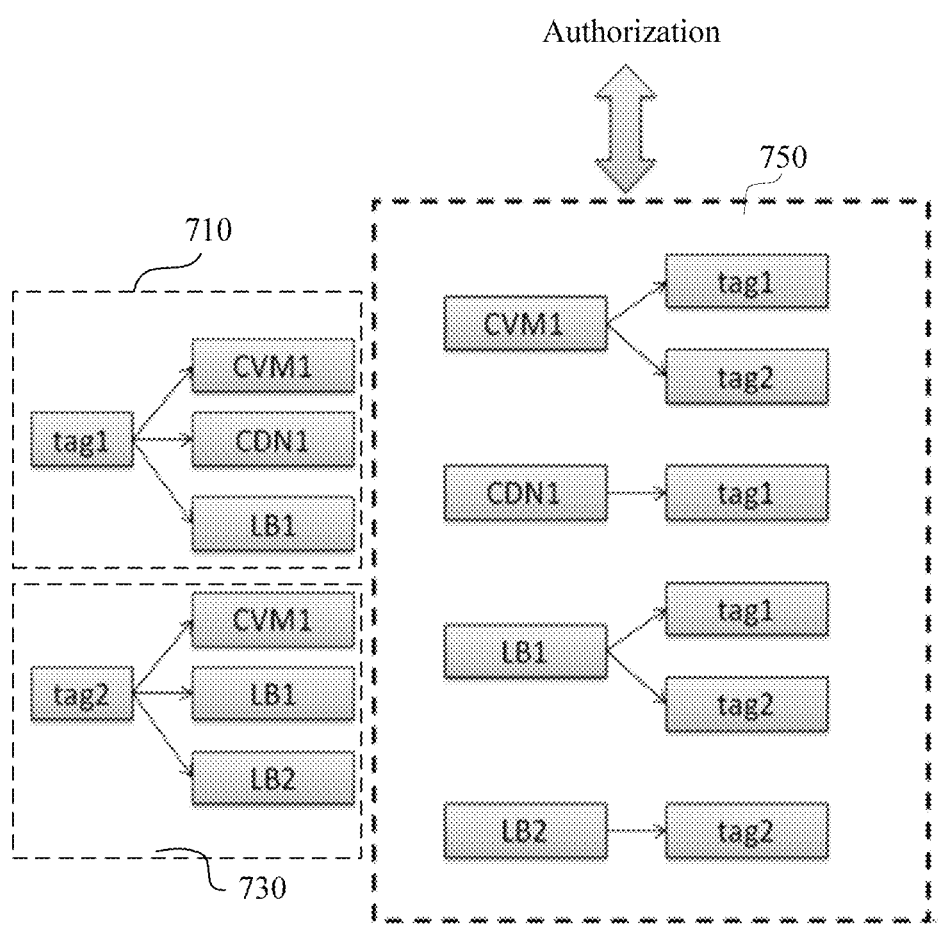
FIG. 9 is a schematic diagram of authorization implemented based on tag information according to an exemplary embodiment.

FIG. 9 is a schematic diagram of authorization implemented based on tag information according to an exemplary embodiment. Cloud service resource includes a cloud server resource CVM1, a cloud server resource CVM2, a CDN service resource CDN1, a CDN service resource CDN2, LB1, LB2, and the like.

As shown in FIG. 9, a tag 1 and a tag 2 are two tags, and are used to separately represent different tag information. In this exemplary embodiment, CVM1, CDN1, and LB1 are used as a category of resources, to give authorization to a category of users for access. CVM1, LB1, and LB2 are used as a category of resources.

Based on this, CVM1, CDN1, and LB1 are tagged with the tag 1, and the tag 1 is authorized to a user. CVM1, LB1, and LB2 are tagged with the tag 2.

In this way, an association relationship between the tag 1 and CVM1, CDN1, and LB1 is formed, that is, a box-selected association relationship 710 shown in FIG. 9. Correspondingly, an association relationship between the tag 2 and CVM1, LB1, and LB2 is formed, that is, a box-selected association relationship 730 shown in FIG. 9.

The association relationships are separately implemented by using both the tags and the cloud service resources as indexes, that is, a bidirectional index, so that the association relationships are applied to an authorization process.

Association relationships that are shown in an area 750 and that are between the cloud service resources and the tags are obtained based on the established association relationships. In this case, a tag is authorized to a user, that is, the authorization process is completed.

During implementation of tag management, in addition to implementing the foregoing authorization, resources that can be accessed by a corresponding user may further be added or deleted by updating the association relationships between the tags and the cloud service resources.

The permission management process may be used to implement permission configuration of the cloud service resources. Specifically, an association relationship is established for a tag granted to a user and access permission. The access permission indicates a user operation that can be triggered by the user for a cloud service resource.

The access permission necessary for access to the cloud service is configured by using the tag as a parameter, and based on this, a subsequent authentication process is implemented.

Finally, for the authentication, because the tag exists, permission of authentication matching includes resource-level permission and tag-level permission. The resource-level permission is resource permission, and the tag-level permission is the access permission granted to the user.

Figure 10:
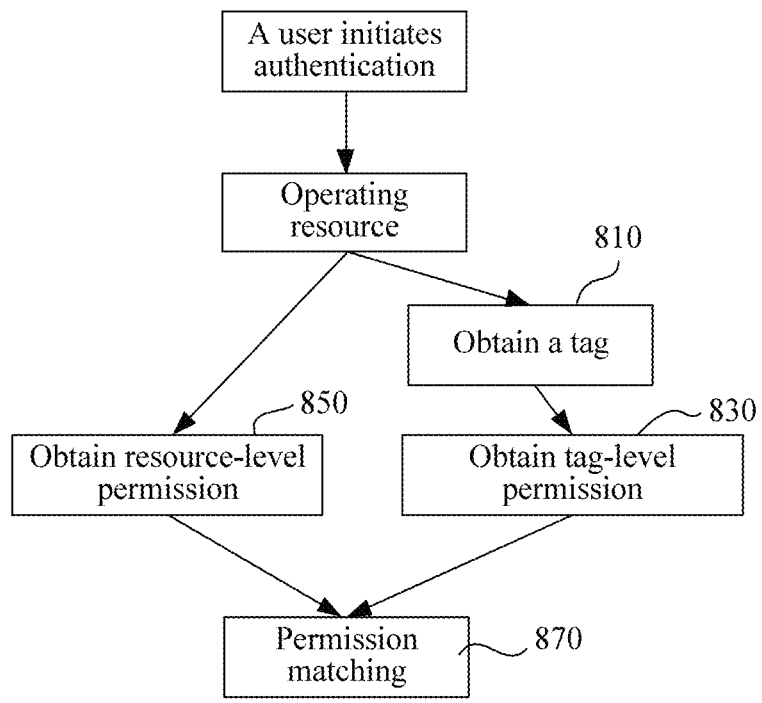
FIG. 10 is a flowchart of authentication according to an exemplary embodiment.

FIG. 10 is a flowchart of authentication according to an exemplary embodiment. After a user initiates authentication, a tag to be granted to the user is obtained for an operated resource. That is, step 810 is performed, and step 830 is performed. Tag-level permission is obtained based on an association relationship.

On the other hand, resource-level permission may also be obtained based on a tag written by the operated resource. That is, step 850 is performed.

In this way, step 870 may be performed. That is, permission matching is performed, to determine whether an operation permitted to be performed.

Cross-service authorization is performed based on a tag by using the foregoing brief implementation manner. The user authorization efficiency may be significantly improved, and an authorization strategy is more flexible and is easier to be understood and expressed, so that an authentication requirement of multiple cloud service users, especially high-end cloud users, may be satisfied well.

The following describes an apparatus embodiment provided in the present disclosure. The apparatus embodiment may be applied to implement the foregoing resource access control method embodiment of the present disclosure implemented by the control server 130. For details not disclosed in the apparatus embodiments of the present disclosure, refer to the resource access control method embodiments of the present disclosure.

Figure 11:
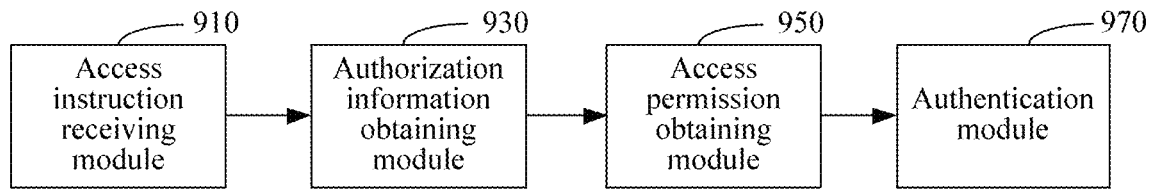
FIG. 11 is a block diagram of a resource access control apparatus according to an exemplary embodiment.

FIG. 11 is a block diagram of a resource access control apparatus according to an exemplary embodiment. The resource access control apparatus may be applied to the implementation environment shown in FIG. 1, and to perform all steps of the resource access control method shown in FIG. 3. As shown in FIG. 11, the resource access control apparatus includes, but is not limited to, an access instruction receiving module 910, an authorization information obtaining module 930, an access permission obtaining module 950, and an authentication module 970.

The access instruction receiving module 910 is configured to receive a group resource access instruction, where the group resource access instruction indicates a group resource to which a user requests access.

The authorization information obtaining module 930 is configured to obtain tag information granted to the user from tag information associated with the group resource.

The access permission obtaining module 950 is configured to obtain access permission associated with the tag information based on the tag information granted to the user.

The authentication module 970 is configured to: match the access permission is matched with resource permission of the group resource, and permit or reject a group resource access requested by the user based on a comparison result.

In an exemplary embodiment, the group resource access instruction is a cross-group resource access instruction. The authorization information obtaining module 930 is further configured to obtain, from an association relationship between the group resource and the tag information, the tag information that is associated with the group resource to which the user requests access and that is granted to the user, where the group resource requested by the user belongs to at least two groups.

In an exemplary embodiment, the access permission obtaining module 950 is further configured to obtain, from an association relationship between the tag information and the access permission, the access permission that is in the group resource access requested by the user and that is associated with the tag information granted to the user.

The association relationship between tag information and the group resource and the association relationship between the tag information and the access permission may be pre-stored.

Figure 12:
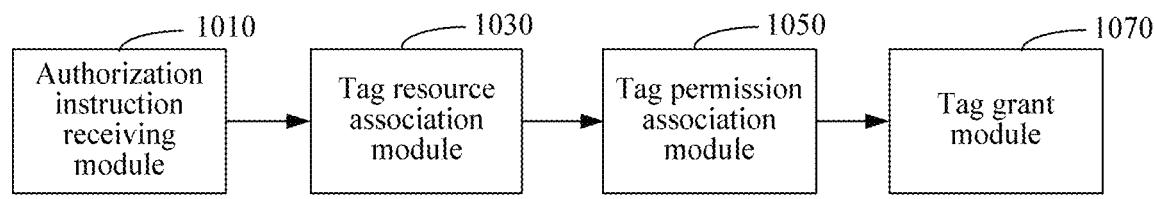
FIG. 12 is a block diagram of a resource access control apparatus according to another exemplary embodiment.

FIG. 12 is a block diagram of a resource access control apparatus according to another exemplary embodiment. As shown in FIG. 12, the resource access control apparatus further includes, but is not limited to, an authorization instruction receiving module 1010, a tag resource association module 1030, a tag permission association module 1050, and a tag grant module 1070.

The authorization instruction receiving module 1010 is configured to receive an authorization instruction of a group resource, where the authorization instruction of a group resource indicates a user and a group resource that request authorization.

The tag resource association module 1030 is configured to: create tag information for the group resource, and obtain an association relationship between the created tag information and the group resource.

The tag permission association module 1050 is configured to: configure access permission for the created tag information, and establish an association relationship between the tag information and the access permission.

The tag grant module 1070 is configured to grant the tag information having the association relationship with the access permission to the user requesting authorization.

Figure 13:
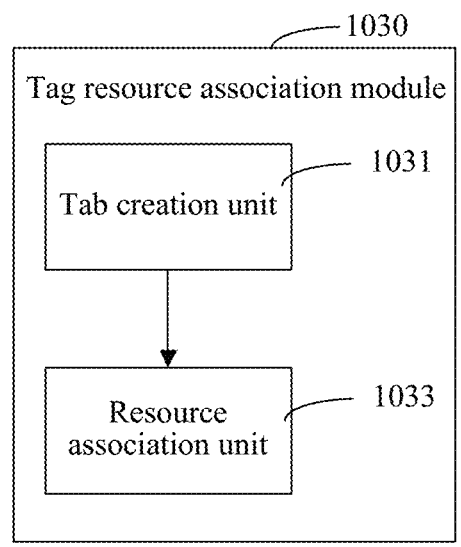
FIG. 13 is a block diagram of a tag resource association module shown in the corresponding embodiment of FIG. 12.

FIG. 13 is a block diagram of the tag resource association module shown in the corresponding embodiment of FIG. 12. The group resource requesting authorization belongs to at least two groups. As shown in FIG. 13, the tag resource association module 1030 includes a tag creation unit 1031 and a resource association unit 1033.

The tag creation unit 1031 is configured to create the tag information.

The resource association unit 1033 is configured to: associate the tag information with the group resource belonging to at least two groups, and establish an association relationship between the tag information and the group resource in each group.

In an exemplary embodiment, the resource access control apparatus further includes a permission configuration module.

The permission configuration module is configured to: trigger permission configuration of the group resource, and write the tag information to description information or a conditional element of a permission strategy of the group resource, where the tag information is associated with the access permission.

Figure 14:
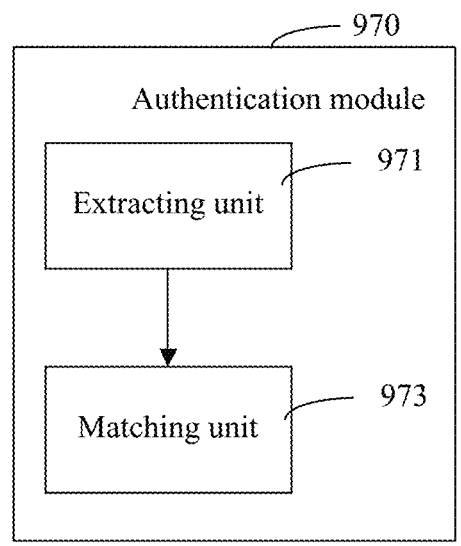
FIG. 14 is a block diagram of an authentication module shown in the corresponding embodiment of FIG. 11.

FIG. 14 is a block diagram of an authentication module shown in the corresponding embodiment of FIG. 11. As shown in FIG. 14, the authentication module 970 includes an extracting unit 971 and a matching unit 973.

The extracting unit 971 is configured to: extract the tag information from the description information or the permission strategy of the group resource, and obtain associated access permission based on the tag information, where the access permission is resource permission of the group resource.

The matching unit 973 is configured to: match the resource permission with access permission granted to the user, to determine whether the resource permission matches the access permission, and if the resource permission matches the access permission, permit the group resource access requested by the user, or if the resource permission does not match the access permission, reject the group resource access requested by the user.

Figure 15:
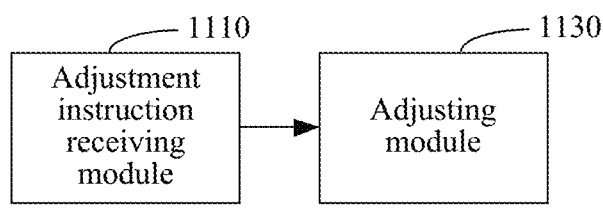
FIG. 15 is a block diagram of a resource access control apparatus according to another exemplary embodiment.

FIG. 15 is a block diagram of a resource access control apparatus according to another exemplary embodiment. As shown in FIG. 15, the resource access control apparatus may include an adjustment instruction receiving module 1110 and an adjusting module 1130.

The adjustment instruction receiving module 1110 is configured to: receive an access permission adjustment instruction of the user, where the access permission adjustment instruction instructs to add or delete a group resource to which access is authorized by the user.

The adjusting module 1130 is configured to: associate, based on the access permission adjustment instruction of the user, the tag information granted to the user with the added group resource, or remove the association relationship between the deleted group resource and the tag information granted to the user from associated group resources.

An embodiment of the present disclosure further provides a control server. The control server may be applied to the implementation environment shown in FIG. 1, and to perform all or some steps of the resource access control method shown in any one of FIG. 3, FIG. 4, FIG. 5, FIG. 6, and FIG. 7. The apparatus includes:

one or more processors; and one or more memories configured to store one or more computer-readable instructions that may be executed by the processors, the memory being non-volatile memories, where the processors are configured to execute the one or more computer-readable instructions stored in the memories, to implement the following steps:

pre-storing an association relationship between tag information and a group resource and an association relationship between the tag information and access permission;

receiving a group resource access instruction, the group resource access instruction indicating a group resource to which a user requests access;

obtaining tag information granted to the user from the tag information associated with the group resource;

obtaining access permission associated with the tag information based on the tag information granted to the user; and comparing the access permission with resource permission of the group resource, and permitting or rejecting, based on a comparison result, a group resource access requested by the user.

A specific implementation of an operation performed by the processors of the apparatus in this embodiment is described in detail in the embodiments of the resource access control method, and details are not described herein.

An embodiment of the present disclosure provides a non-volatile computer-readable storage medium, storing a computer-readable instruction, the computer-readable instruction causing at least one processor to implement the foregoing resource access control method.

In the technical solutions of the present disclosure, access control of a group resource is implemented based on tag information. On one hand, tag information granted to a user is associated with the group resource. On the other hand, the tag information granted to the user is further associated with access permission. Therefore, authorization of the group resource and configuration of the access permission for the user may be implemented under an effect of the tag information. The tag information granted to the user may be associated with a group resource of at least two groups. That is, the user may be authorized in batches for a cross-group resource, thereby implementing access control of the cross-group resource.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A resource access control method performed at a computing device that provides a plurality of cloud services, each of the cloud services including cloud service resources, the computing device having one or more processors and memory storing programs to be executed by the one or more processors, the method comprising:
   pre-storing (i) association relationships between respective tag information and group resources and (ii) association relationships between the respective tag information and access permissions, wherein:
      each tag information identifies a respective category of resources and a corresponding plurality of users authorized to access the respective category of resources;
      each category of resources includes a plurality of group resources; and
      a respective access permission indicates user accessibility of a group resource and one or more operations that are performed on the group resource;
   receiving a group resource access instruction from a user, the group resource access instruction indicating a first group resource to which the user requests access;
   in response to the group resource access instruction, obtaining tag information that is associated with the first group resource;
   determining, based on the tag information that is associated with the first group resource, that the first group resource belongs to a first category of resources and belongs to a second category of resources;
   obtaining tag information granted to the user from the tag information associated with the first group resource;
   obtaining access permission associated with the tag information based on the tag information granted to the user; and
   comparing the access permission with resource permission of the first group resource, and
   based on the comparison, granting access of the first group resource to the first user, including operations in the first category of resources and in the second category of resources to which the first group resource belongs.

2. The method according to claim 1, wherein obtaining access permission associated with the tag information based on the tag information granted to the user further comprises:
   obtaining, from the association relationship between the tag information and the access permission, the access permission for the first group resource to which the user requests access and the tag information granted to the user.

3. The method according to claim 1, further comprising:
   receiving an authorization instruction for the user and a second group resource that request authorization;
   creating tag information for the second group resource, and obtaining an association relationship between the created tag information and the second group resource;
   configuring access permission for the created tag information, and establishing an association relationship between the tag information and the access permission; and
   granting the tag information having the association relationship with the access permission to the user requesting authorization.

4. The method according to claim 3, wherein the second group resource requesting authorization belongs to the first category of resources and belongs to the second category of resources, and the creating tag information for the second group resource, and obtaining the association relationship between the created tag information and the second group resource comprises:
   creating the tag information; and
   associating the tag information with the second group resource belonging to the first category of resources and belongs to the second category of resources, including establishing an association relationship between the tag information and the group resource in the first and second categories.

5. The method according to claim 4, further comprising:
   before receiving the authorization instruction for the user and the second group resource:
   triggering permission configuration of the second group resource, and writing the tag information to description information or a conditional element of a permission strategy of the second group resource, wherein the tag information is associated with the access permission.

6. The method according to claim 5, further comprising:
   receiving a request from the user to access the second group resource;
   in response to the request, extracting the tag information from the description information or the permission strategy of the second group resource, and obtaining associated access permission based on the tag information, wherein the access permission is resource permission of the second group resource;
   comparing the resource permission with access permission granted to the user, to determine whether the resource permission matches the access permission;
   in accordance with a determination that the resource permission matches the access permission, permitting the second group resource access requested by the user; and
   in accordance with a determination that the resource permission does not match the access permission, rejecting the second group resource access requested by the user.

7. The method according to claim 1, further comprising:
   receiving an access permission adjustment instruction of the user, wherein the access permission adjustment instruction instructs to add or delete a group resource to which access is authorized by the user; and
   associating, based on the access permission adjustment instruction of the user, the tag information granted to the user with the added group resource, or removing the association relationship between the deleted group resource and the tag information granted to the user from associated group resources.

8. A computing device that provides a plurality of cloud services, each of the cloud services including cloud service resources, the computing device comprising:
one or more processors;
memory coupled to the one or more processors; and
a plurality of programs stored in the memory that, when executed by the one or more processors, cause the computing device to perform a plurality of operations including:
pre-storing (i) association relationships between respective tag information and group resources and (ii) association relationships between the respective tag information and access permissions, wherein:
each tag information identifies a respective category of resources and a corresponding plurality of users authorized to access the respective category of resources;
each category of resources includes a plurality of group resources; and
a respective access permission indicates user accessibility of a group resource and one or more operations that are performed on the group resource;
receiving a group resource access instruction from a user, the group resource access instruction indicating a first group resource to which the user requests access;
in response to the group resource access instruction, obtaining tag information that is associated with the first group resource;
determining, based on the tag information that is associated with the first group resource, that the first group resource belongs to a first category of resources and belongs to a second category of resources;
obtaining tag information granted to the user from the tag information associated with the first group resource;
obtaining access permission associated with the tag information based on the tag information granted to the user; and
comparing the access permission with resource permission of the first group resource; and
based on the comparison, granting access of the first group resource to the user, including operations in the first category of resources and in the second category of resources to which the first group resource belongs.

9. The computing device according to claim 8, wherein the operation of obtaining access permission associated with the tag information based on the tag information granted to the user further comprises:
obtaining, from the association relationship between the tag information and the access permission, the access permission for the first group resource to which the user requests access and the tag information granted to the user.

10. The computing device according to claim 8, wherein the plurality of operations include:
receiving an authorization instruction for the user and a second group resource that request authorization;
creating tag information for the second group resource, and obtaining an association relationship between the created tag information and the second group resource;
configuring access permission for the created tag information, and establishing an association relationship between the tag information and the access permission; and
granting the tag information having the association relationship with the access permission to the user requesting authorization.

11. The computing device according to claim 10, wherein the second group resource requesting authorization belongs to the first category of resources and belongs to the second category of resources, and the creating tag information for the second group resource, and obtaining the association relationship between the created tag information and the second group resource comprises:
creating the tag information; and
associating the tag information with the second group resource belonging to the first category of resources and belongs to the second category of resources, including establishing an association relationship between the tag information and the group resource in the first and second categories.

12. The computing device according to claim 11, wherein the plurality of operations include:
before receiving the authorization instruction for the user and the second group resource;
triggering permission configuration of the second group resource, and writing the tag information to description information or a conditional element of a permission strategy of the second group resource, wherein the tag information is associated with the access permission.

13. The computing device according to claim 12, the plurality of operations further comprises:
receiving a request from the user to access the second group resource;
in response to the request, extracting the tag information from the description information or the permission strategy of the second group resource, and obtaining associated access permission based on the tag information, wherein the access permission is resource permission of the second group resource;
comparing the resource permission with access permission granted to the user, to determine whether the resource permission matches the access permission;
in accordance with a determination that the resource permission matches the access permission, permitting the second group resource access requested by the user; and
in accordance with a determination that the resource permission does not match the access permission, rejecting the second group resource access requested by the user.

14. The computing device according to claim 8, wherein the plurality of operations include:
receiving an access permission adjustment instruction of the user, wherein the access permission adjustment instruction instructs to add or delete a group resource to which access is authorized by the user; and
associating, based on the access permission adjustment instruction of the user, the tag information granted to the user with the added group resource, or removing the association relationship between the deleted group resource and the tag information granted to the user from associated group resources.

15. A non-transitory computer readable storage medium storing a plurality of instructions in connection with a computing device that provides a plurality of cloud services, each of the cloud services including cloud service resources, the computing device having one or more processors, wherein the plurality of instructions, when executed by the one or more processors, cause the computing device to perform a plurality of operations including:
pre-storing (i) association relationships between respective tag information and group resources and (ii) association relationships between the respective tag information and access permissions, wherein:
  each tag information identifies a respective category of resources and a corresponding plurality of users authorized to access the respective category of resources;
  each category of resources includes a plurality of group resources; and
  a respective access permission indicates user accessibility of a group resource and one or more operations that are performed on the group resource;
receiving a group resource access instruction from a user, the group resource access instruction indicating a first group resource to which the user requests access;
in response to the group resource access instruction, obtaining tag information that is associated with the first group resource;
determining, based on the tag information that is associated with the first group resource, that the first group resource belongs to a first category of resources and belongs to a second category of resources;
obtaining tag information granted to the user from the tag information associated with the first group resource;
obtaining access permission associated with the tag information based on the tag information granted to the user; and
comparing the access permission with resource permission of the first group resource, and based on the comparison, granting access of the first group resource to the user, including operations in the first category of resources and in the second category of resources to which the first group resource belongs.

16. The non-transitory computer readable storage medium according to claim 15, wherein the operation of obtaining access permission associated with the tag information based on the tag information granted to the user further comprises:
  obtaining, from the association relationship between the tag information and the access permission, the access permission for the first group resource to which the user requests access and the tag information granted to the user.

17. The non-transitory computer readable storage medium according to claim 15, wherein the plurality of operations further comprises:
  receiving an authorization instruction for the user and a second group resource that request authorization;
  creating tag information for the second group resource, and obtaining an association relationship between the created tag information and the second group resource;
  configuring access permission for the created tag information, and establishing an association relationship between the tag information and the access permission; and
  granting the tag information having the association relationship with the access permission to the user requesting authorization.

\* \* \* \* \*